United States Patent
Amemiya

(10) Patent No.: US 9,278,714 B2
(45) Date of Patent: Mar. 8, 2016

(54) VEHICLE BODY FRONT SECTION STRUCTURE

(71) Applicant: TOYOTA JIDOSHA KABUSHIKI KAISHA, Toyota-shi (JP)

(72) Inventor: Koji Amemiya, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/400,650

(22) PCT Filed: Dec. 25, 2013

(86) PCT No.: PCT/JP2013/085324
§ 371 (c)(1),
(2) Date: Nov. 12, 2014

(87) PCT Pub. No.: WO2014/104396
PCT Pub. Date: Jul. 3, 2014

(65) Prior Publication Data
US 2015/0130223 A1     May 14, 2015

(30) Foreign Application Priority Data
Dec. 27, 2012 (JP) ................................ 2012-285251

(51) Int. Cl.
*B62D 25/08*     (2006.01)
*B62D 29/00*     (2006.01)

(52) U.S. Cl.
CPC ............ *B62D 25/088* (2013.01); *B62D 29/008* (2013.01)

(58) Field of Classification Search
CPC ............................ B62D 25/088; B62D 29/088
USPC ...................................................... 296/203.02
See application file for complete search history.

(56) References Cited

U.S. PATENT DOCUMENTS

| 5,346,276 A | * | 9/1994 | Enning et al. | ............ 296/203.02 |
| 6,332,642 B1 | * | 12/2001 | Hanyu | ...................... 296/203.02 |
| 6,547,317 B1 | * | 4/2003 | Cheron et al. | ........... 296/193.01 |
| 8,973,980 B2 | * | 3/2015 | Mildner et al. | .......... 296/193.09 |

FOREIGN PATENT DOCUMENTS

| JP | H05-85410 A | 4/1993 |
| JP | H06-27442 U | 4/1994 |
| JP | 2001-080544 A | 3/2001 |
| JP | 2004-249801 A | 9/2004 |
| JP | 2005-219607 A | 8/2005 |
| JP | 2007-309471 A | 11/2007 |

* cited by examiner

Primary Examiner — Dennis H Pedder
(74) Attorney, Agent, or Firm — Kenyon & Kenyon LLP

(57) ABSTRACT

A vehicle body front section structure includes: a suspension tower; an apron upper member that extends in a vehicle front-rear direction along a top wall portion of the suspension tower, a pair of frames that are disposed to a vehicle front side and a vehicle rear side of the suspension tower, that extend from the apron upper member towards a vehicle lower side and vehicle width direction inner side, and that are integrally formed with a cast-formed suspension tower structural body together with the suspension tower and the apron upper member; a cross rib that is formed at the apron upper member and that extends along the apron upper member; and a pair of vertical ribs that are respectively formed at the pair of frames, that extend along each of the pair of frames, and that are connected to the cross rib.

10 Claims, 3 Drawing Sheets

VEHICLE BODY FRONT SECTION STRUCTURE

CROSS-REFERENCE TO RELATED APPLICATIONS

This is a national phase application based on the PCT International Patent Application No. PCT/JP2013/085324 filed Dec. 25, 2013, claiming priority to Japanese Patent Application No. 2012-285251 filed Dec. 27, 2012, the entire contents of both of which are incorporated herein by reference.

TECHNICAL FIELD

The present invention relates to a vehicle body front section structure.

BACKGROUND ART

The following technology is an example of a known vehicle body front section structure. Japanese Patent Application Laid-Open (JP-A) No. H05-85410 describes a front section vehicle body structure including a suspension tower portion. In this front section vehicle body structure, an extension portion is provided extending inside a closed cross-section of an apron reinforcement at an upper end portion of the suspension tower portion. The extension portion divides the closed cross-section of the apron reinforcement into two, and is joined to the panels that configure the apron reinforcement.

According to this front section vehicle body structure, the rigidity of the apron reinforcement can be increased by the extension portion. The rigidity of the suspension tower portion with respect to upwards load (input along the vehicle up-down direction) from the suspension can accordingly be increased due to coupling together the portion of the apron reinforcement with increased rigidity and the suspension tower portion with the extension portion.

Further examples of related technology are found in JP-A No. 2007-309471, JP-A No. 2004-249801, JP-A No. 2005-219607, Japanese Utility Model Application Laid-Open (JP-U) No. H06-27442, and JP-A No. 2001-80544.

SUMMARY OF INVENTION

Technical Problem

However, in the front section vehicle body structure described above, although the rigidity of the suspension tower portion can be increased with respect to input along the vehicle up-down direction, there is room for improvement with regards to increasing the rigidity of the suspension tower portion with respect to input along the vehicle front-rear direction and along the vehicle width direction.

In consideration of the above circumstances, the present invention provides a vehicle body front section structure capable of increasing the rigidity of a suspension tower with respect to input along the three directions of the vehicle up-down direction, the vehicle front-rear direction and the vehicle width direction.

Solution to Problem

According to a first aspect of the present invention, a vehicle body front section structure includes a suspension tower that houses a front suspension; an apron upper member that extends in a vehicle front-rear direction along a top wall portion of the suspension tower; a pair of frames that are disposed at a vehicle front side and a vehicle rear side of the suspension tower, that extend from the apron upper member towards a vehicle lower side and a vehicle width direction inner side, and that are integrally formed with a cast-formed suspension tower structural body together with the suspension tower and the apron upper member; a cross rib that is formed at the apron upper member and that extends along the apron upper member; and a pair of vertical ribs that are respectively formed at the pair of frames, that extend along each of the pair of frames, and that are connected to the cross rib.

According to this vehicle body front section structure, the suspension tower, the apron upper member, and the pair of frames are integrally formed with the cast-formed suspension tower structural body. The apron upper member extends in the vehicle front-rear direction along the top wall portion of the suspension tower. The pair of frames are disposed at the vehicle front side and the vehicle rear side of the suspension tower, and extend from the apron upper member towards the vehicle lower side and the vehicle width direction inner side. The cross rib that extends along the apron upper member is formed at the apron upper member, and the pair of vertical ribs that extend along each of the pair of frames are formed at the respective frames. The pair of vertical ribs are connected to the cross rib.

The suspension tower can accordingly be supported by the apron upper member, the pair of frames, the cross rib, and the pair of vertical ribs described above in the event of input into the suspension tower along any direction out of the vehicle up-down direction, the vehicle front-rear direction and the vehicle width direction. The rigidity of the suspension tower can accordingly be increased (deformation of the suspension tower can be suppressed) with respect to input in the three directions of the vehicle up-down direction, the vehicle front-rear direction and the vehicle width direction.

According to a second aspect of the present invention, in the first aspect of the vehicle body front section structure, the vehicle body front section structure may further includes a front side member that extends in the vehicle front-rear direction along a lower portion of the suspension tower, wherein the pair of frames couple together the front side member and the apron upper member.

According to this vehicle body front section structure, the pair of frames couple together the front side member and the apron upper member. The rigidity of the suspension tower can accordingly be further increased with respect to input in the three directions of the vehicle up-down direction, the vehicle front-rear direction, and the vehicle width direction.

According to a third aspect of the present invention, in either the first aspect or the second aspect of the vehicle body front section structure, the apron upper member and the pair of frames may be formed with open cross-section profiles.

According to this vehicle body front section structure, the apron upper member and the pair of frames are formed with open cross-section profiles. The cast-formed suspension tower can be accordingly easy to manufacture.

According to a fourth aspect of the present invention, in the third aspect of the vehicle body front section structure, the cross rib may project out towards the apron upper member cross-section inside, and the pair of vertical ribs may project out towards respective cross-section insides of the pair of frames.

According to this vehicle body front section structure, the cross rib projects out towards the apron upper member cross-section inside. The rigidity of the apron upper member can accordingly be increased by the cross rib whilst suppressing the cross rib from projecting to the apron upper member cross-section outside. Similarly, the pair of vertical ribs respectively project out towards the respective cross-section insides of the pair of frames. The rigidity of the frames can accordingly be increased whilst suppressing the vertical ribs from projecting to the cross-section outsides of the frames.

According to a fifth aspect of the present invention, in either the third aspect or the fourth aspect of the vehicle body front section structure, the cross rib may be formed between a pair of side wall portions that are formed at the apron upper member and that face each other along the vehicle width direction, and the pair of side wall portions and the cross rib that are formed at the apron upper member may be coupled together by reinforcement ribs that extend along the vehicle width direction.

According to this vehicle body front section structure, the pair of side wall portions and the cross rib that are formed at the apron upper member are coupled together by the reinforcement ribs that extend in the vehicle width direction. The rigidity of the apron upper member can accordingly be increased by the reinforcement ribs.

According to a sixth aspect of the present invention, in any one of the third aspect to the fifth aspect of the vehicle body front section structure, each of the vertical ribs may be formed between a pair of side wall portions that are formed at the respective frames and that face each other along the vehicle front-rear direction, and the pair of side wall portions and the vertical rib formed at the frame may be coupled together by reinforcement ribs that extend along the vehicle front-rear direction.

According to this vehicle body front section structure, the pair of side wall portions and the vertical rib formed at the frame are coupled together by the reinforcement rib that extends along the vehicle front-rear direction. The rigidity of the frame can accordingly be increased by the reinforcement rib.

According to a seventh aspect of the present invention, in any one of the first aspect to the sixth aspect of the vehicle body front section structure, a side portion at the vehicle width direction inner side of the apron upper member may be connected to an end portion on the vehicle width direction outer side of the top wall portion, and the top wall portion may be formed with a gradual change portion that increases in plate thickness on progression towards the vehicle width direction outer side at a vehicle width direction outer side end portion of the top wall portion, thereby forming a greater thickness at the vehicle width direction outer side end portion of the top wall portion than at a vehicle width direction inner side end portion of the top wall portion.

According to this vehicle body front section structure, the top wall portion is formed with the gradual change portion that increases in plate thickness on progression towards the vehicle width direction outer side. The gradual change portion forms a greater thickness at the vehicle width direction outer side end portion of the top wall portion than at the vehicle width direction inner side end portion of the top wall portion. Local deformation can accordingly be suppressed at a join portion between the top wall portion and the apron upper member.

Advantageous Effects of Invention

As described in detail above, according to the present invention, the rigidity of the suspension tower can be increased with respect to input in the three directions of the vehicle up-down direction, the vehicle front-rear direction, and the vehicle width direction.

DESCRIPTION OF EMBODIMENTS

Figure 1:
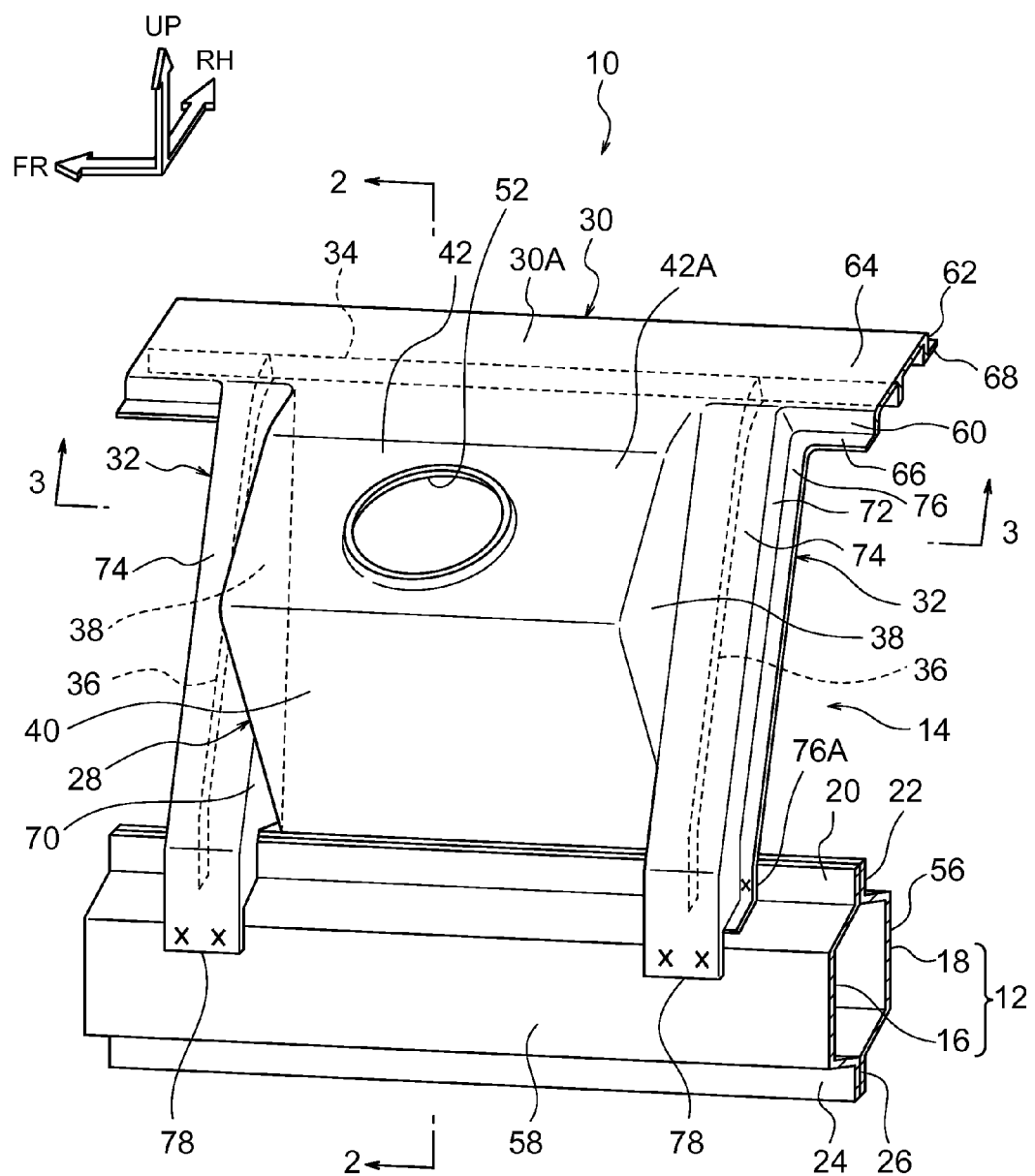
FIG. 1 is a perspective view illustrating a right side portion of a vehicle body front section structure of an exemplary embodiment of the present invention.

Explanation follows regarding an exemplary embodiment of the present invention, with reference to the drawings.

Note that in the drawings, the arrow UP, the arrow FR, and the arrow RH respectively indicate a vehicle up-down direction upper side, a vehicle front-rear direction front side, and a vehicle width direction outer side (vehicle right side).

As illustrated in FIG. 1, a vehicle body front section structure 10 of an exemplary embodiment of the present invention includes a front side member 12 and a suspension tower structural body 14. FIG. 1 illustrates a right side portion of the vehicle body front section structure 10. A left side portion of the vehicle body front section structure 10 is configured with left-right symmetry to the right side portion. In the following description, explanation is given regarding the right side portion of the vehicle body front section structure 10, and explanation regarding the left side portion of the vehicle body front section structure 10 is omitted.

The front side member 12 is disposed further at the vehicle width direction outer side than a vehicle width direction central portion of the vehicle body front section. The front side member 12 extends in the vehicle front-rear direction along a lower portion of a suspension tower 28, described later. The front side member 12 includes a side member inner 16 and a side member outer 18, divided along the vehicle width direction. The side member inner 16 is formed with a hat shaped cross-section profile opening towards the vehicle width direction outer side, and the side member outer 18 is formed with a hat shaped cross-section profile opening towards the vehicle width direction inner side.

An upper flange 20 formed at an upper portion of the side member inner 16 is joined to an upper flange 22 formed at an upper portion of the side member outer 18. A lower flange 24 formed at a lower portion of the side member inner 16 is joined to a lower flange 26 formed at a lower portion of the side member outer 18. The cross-section of the front side member 12 that includes the mutually joined side member inner 16 and the side member outer 18 is thereby configured with a closed cross-section profile.

The suspension tower structural body 14 is for example configured by cast-forming a lightweight metal such as aluminum or a lightweight magnesium alloy. The suspension tower structural body 14 is integrally formed with the suspension tower 28, an apron upper member 30, a pair of frames 32, a cross rib 34, and a pair of vertical ribs 36.

The suspension tower 28 is formed in a tower shape, and includes plural vertical wall portions 38, 40, and a top wall portion 42. A pair of the vertical wall portions 38 face each other along the vehicle front-rear direction, and the vertical wall portion 40 couples together vehicle width direction inner side end portions of the pair of vertical wall portions 38. The top wall portion 42 is respectively connected to vehicle upper side end portions of each of the plural vertical wall portions 38, 40.

Figure 2:
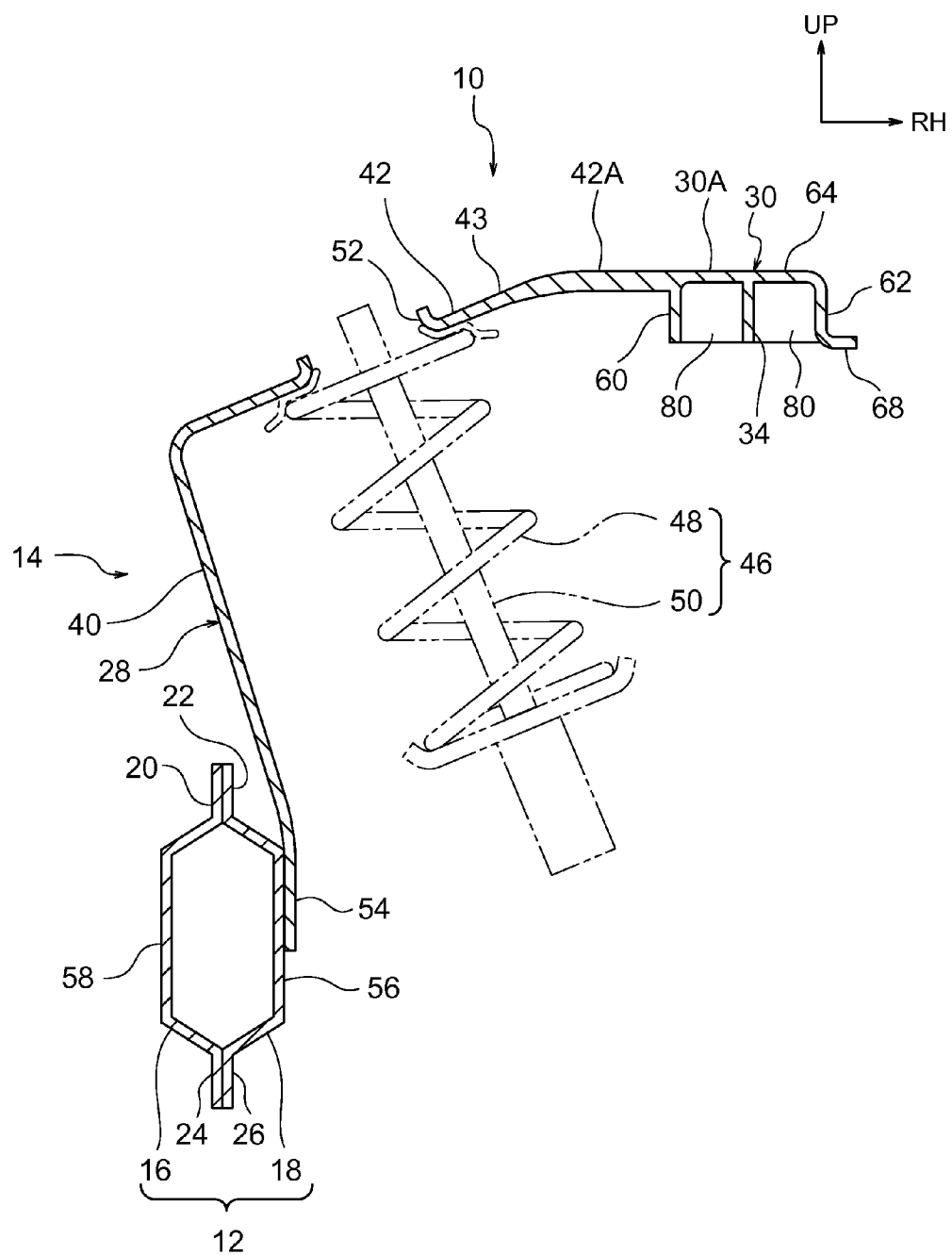
FIG. 2 is a cross-section taken along line 2-2 in FIG. 1.

As illustrated in FIG. 2, a front suspension 46 is housed inside the suspension tower 28. The front suspension 46 is for example configured as a strut type, and includes a spring 48 and a shock absorber 50. A suspension attachment hole 52 is formed at the top wall portion 42, and an upper portion of the front suspension 46 is attached at a peripheral portion of the suspension attachment hole 52 of the top wall portion 42. A flange 54 that extends towards the vehicle lower side is formed at a lower portion of the suspension tower 28. The flange 54 is joined to a vehicle width direction outer side side wall portion 56 out of a pair of side wall portions 56, 58 that are formed at the front side member 12.

As illustrated in FIG. 1, the apron upper member 30 extends in the vehicle front-rear direction along the top wall portion 42 of the suspension tower 28. As illustrated in FIG. 2, the apron upper member 30 is disposed further at the vehicle upper side and at the vehicle width direction outer side than the front side member 12. The apron upper member 30 is formed with an open cross-section profile that is open towards the vehicle lower side. Namely, the apron upper member 30 includes a pair of side wall portions 60, 62 that face each other along the vehicle width direction, and a coupling wall portion 64 that couples together upper end portions of the pair of side wall portions 60, 62.

A vehicle width direction outer side end portion of the top wall portion 42 described above is connected to a vehicle width direction inner side side portion (side wall portion 60) of the apron upper member 30. An upper face 30A of the apron upper member 30 is formed continuously at an upper face 42A of the top wall portion 42. The top wall portion 42 is formed with a gradual change portion 43 that increases in plate thickness on progression towards the vehicle width direction outer side. The gradual change portion 43 forms a greater thickness at a vehicle width direction outer side end portion of the top wall portion 42 than at a vehicle width direction inner side end portion of the top wall portion 42.

As illustrated in FIG. 1, out of the pair of side wall portions 60, 62 formed at the apron upper member 30, a flange 66 is formed at the one side wall portion 60 that is positioned further at the vehicle width direction inner side. The flange 66 extends towards the vehicle width direction inner side from a lower end portion of the one side wall portion 60. The flange 66 is respectively formed at portions of the side wall portion 60 that are positioned further at the vehicle front side and the vehicle rear side than the suspension tower 28 and the pair of frames 32. Out of the pair of side wall portions 60, 62, a flange 68 is formed at the other side wall portion 62 that is positioned further at the vehicle width direction outer side. The flange 68 extends from a lower end portion of the side wall portion 62 towards the vehicle width direction outer side. The flange 68 is formed spanning the entire length of the apron upper member 30 along the vehicle front-rear direction.

Figure 3:
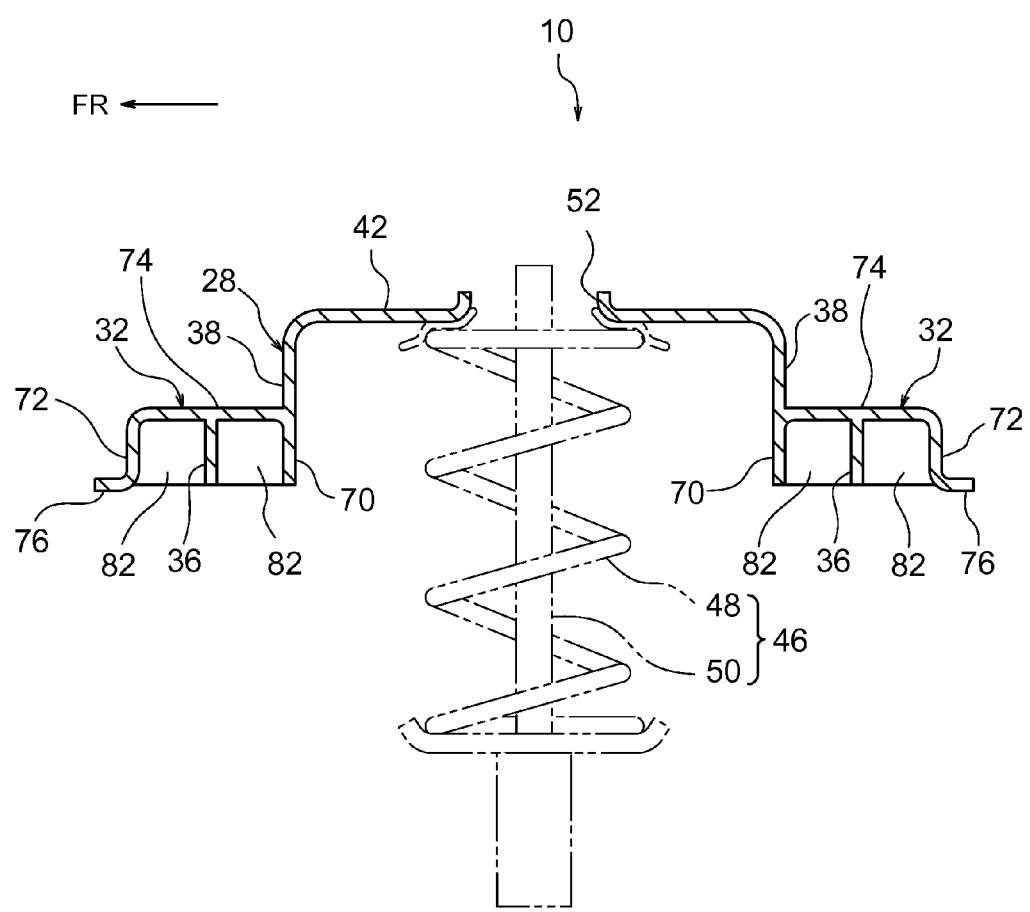
FIG. 3 is a cross-section taken along line 3-3 in FIG. 1.

The pair of frames 32 are respectively disposed at the vehicle front side and the vehicle rear side of the suspension tower 28. The pair of frames 32 extend from the apron upper member 30 towards the vehicle lower side and the vehicle width direction inner side. Each of the frames 32 is formed with an open cross-section profile opening towards the vehicle lower side and the vehicle width direction outer side. Namely, as illustrated in FIG. 3, each of the frames 32 includes a pair of side wall portions 70, 72 that face each other along the vehicle front-rear direction, and a coupling wall portion 74 that couples together one end portions of the pair of side wall portions 70, 72.

In each of the frames 32, out of the pair of side wall portions 70, 72, the one side wall portion 70 positioned at the suspension tower 28 side is formed continuously at the vertical wall portions 38 that form vehicle front-rear direction side portions of the suspension tower 28. Moreover, out of the pair of side wall portions 70, 72, a flange 76 is formed at the other side wall portion 72 positioned at the opposite side to the suspension tower 28 side. The flange 76 is formed at an opposite side end portion of the side wall portion 72 to the coupling wall portion 74, extending towards the opposite side to the side wall portion 70.

Moreover as illustrated in FIG. 1, the pair of frames 32 described above couple together the front side member 12 and the apron upper member 30. Namely, upper end portions of the coupling wall portions 74 formed at each of the frames 32 are connected to a vehicle width direction inner side end portion of the coupling wall portion 64 formed at the apron upper member 30. Moreover, upper end portions of the other side wall portions 72 formed at each of the frames 32 are connected to the vehicle width direction inner side side wall portion 60 formed at the apron upper member 30. Upper end portions of the flanges 76 formed at the respective frames 32 are moreover connected to the vehicle width direction inner side flange 66 formed at the apron upper member 30.

Flanges 78 that extend towards the vehicle lower side are formed at lower end portions of the coupling wall portions 74 of the respective frames 32. The flanges 78 are joined to the vehicle width direction inner side side wall portion 58 of the front side member 12. Lower end portions of the flanges 76 formed at the respective frames 32 are joined to the upper flanges 20, 22 formed at the front side member 12 in a three-layer superimposed state. The joins between the flanges 78 and the side wall portion 58, and the joins between the flanges 76 and the upper flanges 20, 22 may employ for example spot welding.

The cross rib 34 is formed at the apron upper member 30, and extends along the apron upper member 30. The cross rib 34 is formed at the coupling wall portion 64 of the apron upper member 30, and projects out from the coupling wall portion 64 towards the cross-section inside of the apron upper member 30. The cross rib 34 is moreover formed between the pair of side wall portions 60, 62 that are formed at the apron upper member 30 (see FIG. 2).

Moreover, as illustrated in FIG. 2, reinforcement ribs 80 are formed extending in the vehicle width direction at the cross-section inside of the apron upper member 30. The reinforcement ribs 80 couple together the pair of side wall portions 60, 62, the coupling wall portion 64 and the cross rib 34 that are formed at the apron upper member 30.

As illustrated in FIG. 1, the pair of vertical ribs 36 are respectively formed at the pair of frames 32, and respectively extend along the pair of frames 32. The vertical ribs 36 are formed at the coupling wall portion 74 of the each of the frames 32, and project out from the coupling wall portions 74 towards the cross-section inside of the frames 32. The vertical ribs 36 are moreover formed between the pairs of side wall portions 70, 72 formed at the frames 32 (see also FIG. 3). Upper end portions of the vertical ribs 36 are connected to the cross rib 34.

As illustrated in FIG. 3, reinforcement ribs 82 are formed extending along the vehicle front-rear direction at the cross-section inside of the respective frames 32. The reinforcement ribs 82 couple together the pair of side wall portions 70, 72, the coupling wall portion 74 and the vertical rib 36 that are formed at each of the frames 32.

Note that the reinforcement ribs 80, 82 are integrally formed with the suspension tower structural body 14 during manufacture of the suspension tower structural body 14.

Explanation follows regarding operation of an exemplary embodiment of the present invention.

As has been described in detail above, in the vehicle body front section structure 10 of the exemplary embodiment of the present invention, the cast-formed suspension tower structural body 14 is integrally formed with the suspension tower 28, the apron upper member 30, and the pair of frames 32. The apron upper member 30 extends in the vehicle front-rear direction along the top wall portion 42 of the suspension tower 28, and the pair of frames 32 are respectively disposed at the vehicle front side and the vehicle rear side of the suspension tower 28, the pair of frames 32 extending from the apron upper member 30 towards the vehicle lower side and the vehicle width direction inner side. The cross rib 34 that extends along the apron upper member 30 is formed at the apron upper member 30, and the pair of vertical ribs 36 respectively extending along the pair of frames 32 are formed at the pair of frames 32 respectively. The pair of vertical ribs 36 are connected to the cross rib 34.

The apron upper member 30, the pair of frames 32, the cross rib 34 and the pair of vertical ribs 36 described above are accordingly capable of supporting the suspension tower 28 even in the event of input from the front suspension 46 to the suspension tower 28 along any direction out of the vehicle up-down direction, the vehicle front-rear direction and the vehicle width direction. The rigidity of the suspension tower 28 with respect to input along the three directions of the vehicle up-down direction, the vehicle front-rear direction and the vehicle width direction can accordingly be increased (deformation of the suspension tower 28 can be suppressed).

Namely, in the event of input to the suspension tower 28 along the vehicle up-down direction, deformation of the suspension tower 28 can be suppressed due to the overall bending rigidity of the apron upper member 30 and the pair of frames 32. In the event of input to the suspension tower 28 along the vehicle front-rear direction or the vehicle width direction, deformation of the suspension tower 28 can be suppressed due to the bending rigidity (in-plane bending rigidity) of the wall portions out of the plural wall portions configuring the apron upper member 30 and the pair of frames 32 that are orthogonal to the input direction. Moreover, due to connecting together the pair of vertical ribs 36 and the cross rib 34, it is possible to employ the bending rigidity not only of the wall portions that are orthogonal to the input direction, but also the bending rigidity of the other wall portions out of the plural wall portions configuring the apron upper member 30 and the pair of frames 32. Deformation of the suspension tower 28 can accordingly be even more efficiently suppressed.

The pair of frames 32 couple together the front side member 12 and the apron upper member 30. The rigidity of the suspension tower 28 with respect to input in the three directions of the vehicle up-down direction, the vehicle front-rear direction and the vehicle width direction can accordingly be further increased.

Local deformation at the connection portions between the apron upper member 30 and the pair of frames 32 can moreover be suppressed since the apron upper member 30 and the pair of frames 32 are integrally formed. The rigidity of the suspension tower 28 can accordingly be effectively increased.

The apron upper member 30 and the frames 32 are formed with open cross-section profiles. The cast-formed suspension tower structural body 14 can be accordingly easy to manufacture.

The cross rib 34 projects out towards the cross-section inside of the apron upper member 30. The rigidity of the apron upper member 30 can accordingly be increased by the cross rib 34, whilst suppressing the cross rib 34 from projecting to the cross-section outside of the apron upper member 30. Each of the vertical ribs 36 is similarly formed projecting out towards the cross-section inside of each of the pair of frames 32. The rigidity of the frames 32 can accordingly be increased by the vertical ribs 36 whilst suppressing the vertical ribs 36 from projecting to the cross-section outside of the frames 32.

The pair of side wall portions 60, 62, the coupling wall portion 64, and the cross rib 34 that are formed at the apron upper member 30 are coupled together by the reinforcement ribs 80 that are formed extending in the vehicle width direction. The rigidity of the apron upper member 30 can accordingly be increased by the reinforcement ribs 80. Similarly, the pairs of side wall portions 70, 72, the coupling wall portions 74 and the vertical ribs 36 formed at the frames 32 are coupled together by the reinforcement ribs 82 that extend in the vehicle front-rear direction. The rigidity of the frames 32 can accordingly be increased by the reinforcement ribs 82.

The top wall portion 42 is formed with the gradual change portion 43 that increases in plate thickness on progression towards the vehicle width direction outer side. The gradual change portion 43 forms a greater thickness at the vehicle width direction outer side end portion of the top wall portion 42 than at the vehicle width direction inner side end portion of the top wall portion 42. Local deformation at the connection portion between the top wall portion 42 and the apron upper member 30 can accordingly be suppressed.

Note that in the exemplary embodiment of the present invention described above, the cross rib 34 is formed at the coupling wall portion 64 of the apron upper member 30, however the cross rib 34 may be formed at any location on the apron upper member 30. Similarly, the vertical ribs 36 are formed at the coupling wall portions 74 of the frames 32, however the vertical ribs 36 may be formed at any location on the frames 32.

Explanation has been given above regarding an exemplary embodiment of the present invention, however the present invention is not limited to the above description, and obviously various modifications may be implemented within a range not departing from the spirit of the present invention.

The disclosures of Japanese Patent Application No. 2012-285251, filed Dec. 27, 2012 is incorporated herein by reference in their entirety. All publications, patent applications, and technical standards mentioned in this specification are herein incorporated by reference to the same extent as if each individual publication, patent application, or technical standard was specifically and individually indicated to be incorporated by reference.

The invention claimed is:

1. A vehicle body front section structure comprising:
   a suspension tower that houses a front suspension;
   an apron upper member that extends in a vehicle front-rear direction with a downwardly facing open cross-section along a top wall portion of the suspension tower;
   a pair of frames that are disposed at a vehicle front side and a vehicle rear side of the suspension tower, that extend from the apron upper member towards a vehicle lower side and vehicle width direction inner side, and that are integrally formed with a cast-formed suspension tower structural body together with the suspension tower and the apron upper member;
   a cross rib that is formed at the apron upper member and that extends in the vehicle front-rear direction and a vehicle vertical direction along the apron upper member; and
   a pair of vertical ribs that are respectively formed at the pair of frames, that extend along each of the pair of frames, and that are connected to the cross rib.

2. The vehicle body front section structure of claim 1, further comprising a front side member that extends in the vehicle front-rear direction along a lower portion of the suspension tower, wherein the pair of frames couple together the front side member and the apron upper member.

3. The vehicle body front section structure of claim 1, wherein the apron upper member and the pair of frames are formed with open cross-section profiles.

4. The vehicle body front section structure of claim 3, wherein:
the cross rib projects out towards the apron upper member cross-section inside, and
the pair of vertical ribs project out towards respective cross-section insides of the pair of frames.

5. The vehicle body front section structure of claim 3, wherein:
the cross rib is formed between a pair of side wall portions that are formed at the apron upper member and that face each other along the vehicle width direction, and
the pair of side wall portions and the cross rib that are formed at the apron upper member are coupled together by reinforcement ribs that extend along the vehicle width direction.

6. The vehicle body front section structure of claim 3, wherein:
each of the vertical ribs is formed between a pair of side wall portions that are formed at the respective frames and that face each other along the vehicle front-rear direction, and
the pair of side wall portions and the vertical ribs formed at the frame are coupled together by reinforcement ribs that extend along the vehicle front-rear direction.

7. The vehicle body front section structure of claim 1, wherein:
a side portion at the vehicle width direction inner side of the apron upper member is connected to an end portion at the vehicle width direction outer side of the top wall portion, and
the top wall portion is formed with a gradual change portion that increases in plate thickness on progression towards the vehicle width direction outer side at a vehicle width direction outer side end portion of the top wall portion, thereby forming a greater thickness at the vehicle width direction outer side end portion of the top wall portion than at a vehicle width direction inner side end portion of the top wall portion.

8. The vehicle body front section structure of claim 2, wherein the apron upper member and the pair of frames are formed with open cross-section profiles.

9. The vehicle body front section structure of claim 4, wherein:
each of the vertical ribs is formed between a pair of side wall portions that are formed at the respective frames and that face each other along the vehicle front-rear direction, and
the pair of side wall portions and the vertical ribs formed at the frame are coupled together by reinforcement ribs that extend along the vehicle front-rear direction.

10. The vehicle body front section structure of claim 5, wherein:
each of the vertical ribs is formed between a pair of side wall portions that are formed at the respective frames and that face each other along the vehicle front-rear direction, and
the pair of side wall portions and the vertical ribs formed at the frame are coupled together by reinforcement ribs that extend along the vehicle front-rear direction.

* * * * *